(No Model.)
A. H. PASCOE.
FISH SCALER AND CLEANER.
No. 578,043. Patented Mar. 2, 1897.
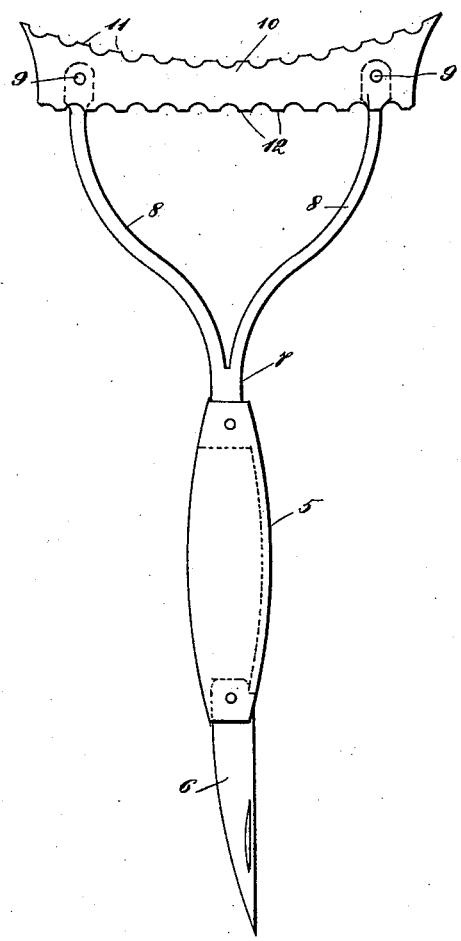

UNITED STATES PATENT OFFICE.

ALFRED HOLT PASCOE, OF PASS CHRISTIAN, MISSISSIPPI.

FISH SCALER AND CLEANER.

SPECIFICATION forming part of Letters Patent No. 578,043, dated March 2, 1897.

Application filed October 21, 1896. Serial No. 609,573. (No model.)

*To all whom it may concern:*

Be it known that I, ALFRED HOLT PASCOE, a citizen of the United States, residing at Pass Christian, in the county of Harrison and State of Mississippi, have invented certain new and useful Improvements in Fish Scalers and Cleaners, of which the following is a full and complete specification, such as will enable those skilled in the art to which it appertains to make and use the same.

This invention relates to fish scalers and cleaners; and the object thereof is to provide an improved device of this class which is simple in construction and operation; and with this and other objects in view the invention consists in the construction, combination, and arrangement of parts hereinafter described and claimed.

The invention is fully disclosed in the following specification, of which the accompanying drawing forms a part, in which numerals of reference are employed to designate the various parts thereof and said drawing being a side view of my improved scaler and cleaner.

In the practice of my invention I provide a handle 5, which may be of any desired form, but which is preferably similar in form to an ordinary knife-handle and which is also preferably composed of metal and which is provided at one end with a blade 6, similar to the ordinary knife-blade and connected with the handle in a similar manner and adapted to be closed or opened.

Secured to the opposite end of the handle is a shank 7, which is provided with two arms or branches 8, which are preferably curved outwardly, as shown, and secured to these arms or branches of the handle by rivets 9, or in any desired manner, is a transverse blade 10, which is preferably composed of steel and of about the thickness of an ordinary table-knife.

The outer edge of the blade 10 is preferably concave, as shown in the drawing, and provided with blunt teeth or projections 11, and the rear or inner edge thereof is preferably straight and provided with similar teeth 12.

The arms 8 of the shank 7 are connected with the blade 10, at about half an inch from the ends thereof, and the operation will be readily understood from the foregoing description when taken in connection with the accompanying drawing.

The blade 10 is designed for use in removing the scales, as will be readily understood, and in this operation the instrument is manipulated in the usual manner, and the blade 6 is designed for use in opening and cleaning the fish.

My improved fish scaler and cleaner is simple in construction and operation, comparatively inexpensive, and perfectly adapted to accomplish the result for which it is intended.

Having fully described my invention, I claim as new and desire to secure by Letters Patent—

A fish scaler and cleaner consisting of a handle, a blade in one end thereof, a shank secured to the opposite end of said handle, two arms fastened to said shank, a transverse blade mounted between said arms having a concave outer surface, and teeth formed on both edges of said blade, said parts being combined substantially as described.

In testimony that I claim the foregoing as my invention I have signed my name, in presence of the subscribing witnesses, this 14th day of October, 1896.

ALFRED HOLT PASCOE.

Witnesses:
WM. H. YOUNG,
R. D. MASSIE.